(12) United States Patent
Lamb et al.

(10) Patent No.: US 9,379,882 B2
(45) Date of Patent: Jun. 28, 2016

(54) SYNCHRONIZATION AND CONTROL USING OUT-OF-BAND CHANNELS IN PASSIVE OPTICAL NETWORK-BASED SYSTEMS

(71) Applicant: Broadcom Corporation, Irvine, CA (US)

(72) Inventors: Lowell D. Lamb, San Ramon, CA (US); Glen Kramer, Petaluma, CA (US); Amit Oren, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 14 days.

(21) Appl. No.: 14/268,856

(22) Filed: May 2, 2014

(65) Prior Publication Data

US 2014/0328593 A1  Nov. 6, 2014

Related U.S. Application Data

(60) Provisional application No. 61/819,458, filed on May 3, 2013.

(51) Int. Cl.
| | |
|---|---|
| H04L 7/00 | (2006.01) |
| H04M 11/06 | (2006.01) |
| H04J 3/06 | (2006.01) |
| H04B 10/27 | (2013.01) |

(52) U.S. Cl.
CPC .............. *H04L 7/0075* (2013.01); *H04B 10/27* (2013.01); *H04J 3/0694* (2013.01); *H04M 11/06* (2013.01); *H04M 11/062* (2013.01)

(58) Field of Classification Search
CPC ..................................................... H04L 7/0075
See application file for complete search history.

(56) References Cited

U.S. PATENT DOCUMENTS

| | | | | |
|---|---|---|---|---|
| 6,490,727 | B1 * | 12/2002 | Nazarathy et al. ............. | 725/129 |
| 2002/0118669 | A1 * | 8/2002 | Kauhanen ............. | H04B 7/2693 370/350 |
| 2007/0195902 | A1 * | 8/2007 | Geile et al. ..................... | 375/260 |
| 2007/0248120 | A1 * | 10/2007 | Ali et al. ........................ | 370/486 |
| 2009/0180491 | A1 * | 7/2009 | Sala et al. ..................... | 370/442 |
| 2011/0222560 | A1 * | 9/2011 | Biederman et al. ........... | 370/503 |
| 2012/0307751 | A1 * | 12/2012 | Dinan ............................ | 370/329 |
| 2013/0004155 | A1 * | 1/2013 | Liang et al. ..................... | 398/9 |

* cited by examiner

*Primary Examiner* — David Payne
*Assistant Examiner* — Casey Kretzer
(74) *Attorney, Agent, or Firm* — Sterne, Kessler, Goldstein & Fox P.L.L.C.

(57) ABSTRACT

Systems and methods are provided to use of out-of-band (OOB) channels for the transport of network-synchronization signals and network control information. These OOB channels transport synchronization and control channels over low-frequency bands outside of the frequency bands used for the data channels. Locating expensive network-synchronization functions in the optical network unit (ONU) and sharing the derived synchronization signals among multiple downstream customer premises equipment (CPE) devices results in cost savings and provides a means for maintaining a continuous, end-to-end synchronization reference, even during periods when the data channels on the copper network segment are in an energy-efficiency mode (e.g., a low-power and/or sleep mode).

20 Claims, 7 Drawing Sheets

SYNCHRONIZATION AND CONTROL USING OUT-OF-BAND CHANNELS IN PASSIVE OPTICAL NETWORK-BASED SYSTEMS

CROSS REFERENCE TO RELATED APPLICATIONS

This application claims the benefit of U.S. Provisional Patent Application No. 61/819,458, filed on May 3, 2013, which is incorporated by reference herein in its entirety.

FIELD OF THE DISCLOSURE

This disclosure relates to passive optical network-based systems, including network synchronization for passive optical networks.

BACKGROUND

A passive optical network (PON) is a point-to-multipoint network architecture comprising an optical line terminal (OLT) at the service provider and ONUs at subscribers for providing the subscribers with broadband services. Standards have been developed to define different types of PONs, each of which serves a different purpose. For example, the various PON types known in the related art include a Broadband PON (BPON), an Ethernet PON (EPON), ten Gigabit-Ethernet PON (10 G-EPON) a Gigabit PON (GPON), ten-Gigabit PON (XG-PON), and others.

Many current-generation and next-generation high-speed, PON-based systems are optimized for residential services. For example, these access networks can include Fiber to the x (FTTx), hybrid fiber-coaxial (HFC), and fiber-fed power-line systems, etc. Adding the ability to transport high-quality network-synchronization signals (useful for timing 3G/4G wireless base-stations, etc.) across the non-PON section of the system often increases the cost and complexity of these systems.

As technology progresses and data rates increase for transmitted signals, greater noise is introduced into the transmitted signals on the non-PON segment of the network, and the difficulty of properly synchronizing network components increases. Further, it becomes more difficult to correct synchronization and control errors that are introduced in the signals during transmission.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
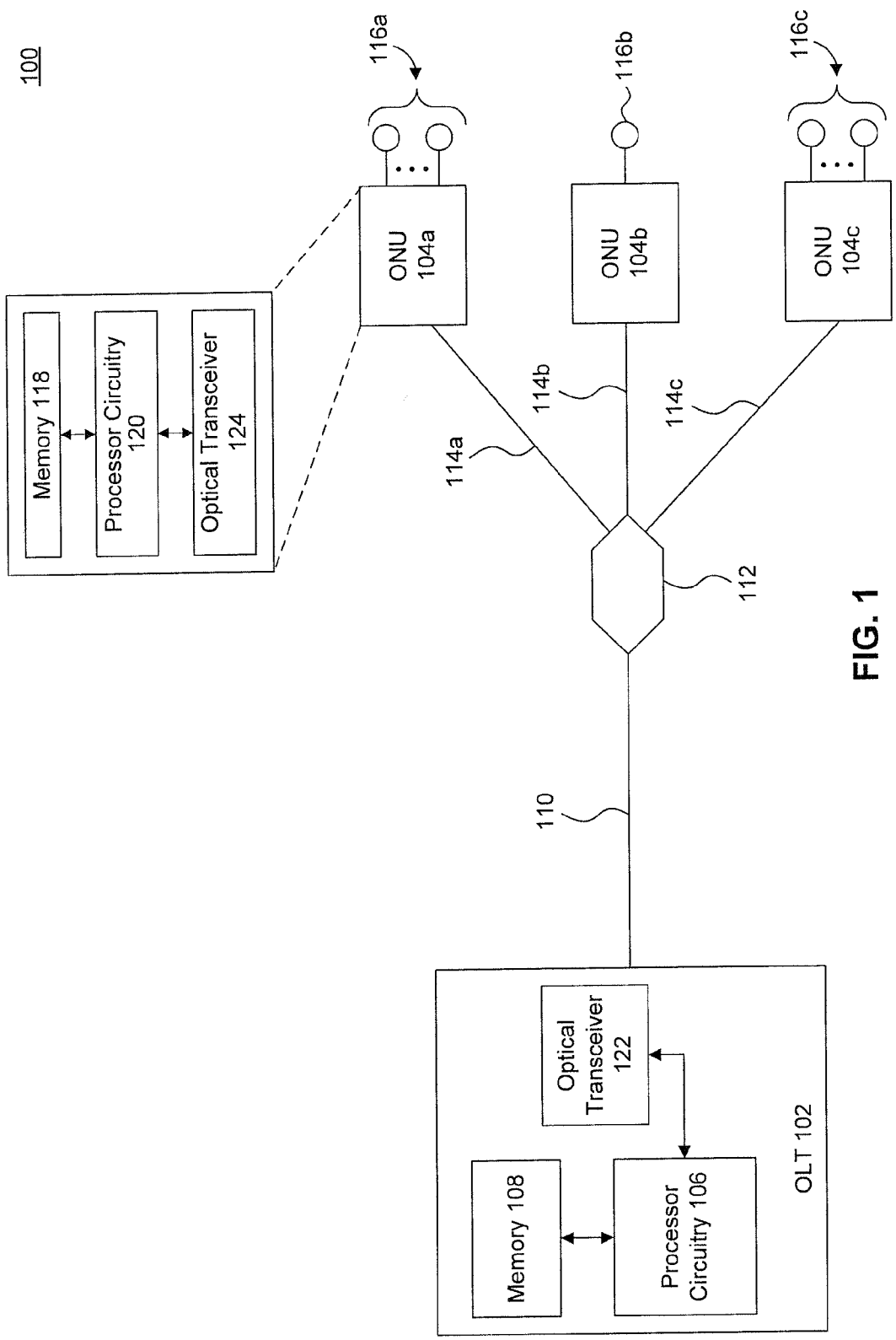
FIG. 1 is a diagram of an example Passive Optical Network (PON) in which embodiments of the present disclosure can be implemented or practiced.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

For purposes of this discussion, the term "module" shall be understood to include one of hardware (such as circuits, microchips, processors, or devices, or any combination thereof), firmware, or code, or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Overview

Embodiments of the present disclosure use out-of-band (OOB) channels for the transport of network-synchronization signals and network control information. In an embodiment, these OOB channels are Fiber to the x (FTTx) OOB Synchronization and Control Channels (FOSC Channels). In an embodiment, these OOB channels are low-frequency bands on the copper link that are outside of the frequency bands used for data channels. These channels have greater immunity from interference from high-frequency noise. They may be used for the transport of synchronization signals, such as frequency information, phase information, time-of-day, etc. and control information (OAM, link-control messaging, etc.).

Embodiments of the present disclosure allow for cost optimization by locating expensive network-synchronization functions in the optical network unit (ONU) and sharing the derived synchronization signals among downstream customer premises equipment (CPE). Embodiments of the present disclosure provide a means for maintaining a continuous, end-to-end synchronization reference, even during periods when the data channels on the copper network segment are in an energy-efficiency mode, such as a low-power and/or sleep mode. Use of FOSC channels in accordance with embodiments of the present disclosure provides a method for transporting high-quality network-synchronization signals available at the ONU across a copper segment of an FTTx network, thus eliminating the need for each CPE to perform a mechanism for synthesizing the desired output sync signal. This consideration is especially important when one ONU has multiple, subtended CPEs.

In an embodiment, these FOSC channels may be used to transport network-synchronization signals for the purpose of timing wireless base-stations (3G, 4G, etc.). Base stations may include macro-cell, small-cell, femto-cell, etc. FOSC channels may be used to transport network-synchronization signals for the purpose of timing customer industrial networks (e.g., Industrial Ethernet). FOSC channels may also be used to transport network-synchronization signals for the purpose of timing customer audio video bridging (AVB) networks.

In an exemplary embodiment, a FTTx communication network includes one or more optical network units (ONUs)/ Dataplane processing units (DPUs) communicatively coupled to at least one CPE via an electrical communication link. The electrical communication link can include, for example, metallic twisted pairs, coaxial cable, or the like. For the purpose of this discussion, the electrical communication link can be referred to as, for example, the copper network segment, copper span, or the like.

In an embodiment, the ONU includes suitable logic, circuitry, and/or code that is configured to convert incoming optical signals from an optical line terminal (OLT) into electrical signals and outgoing electrical signals into optical signals. Here, the incoming optical signals include synchronization information and data. The ONU is configured to generate (e.g., synthesize) an output synchronization signal from the synchronization information received from the OLT via the fiber optic span. The ONU is also configured to exchange control signals between the ONU and a synchronization processor and frequency combiner coupled to the ONU.

Figure 3:
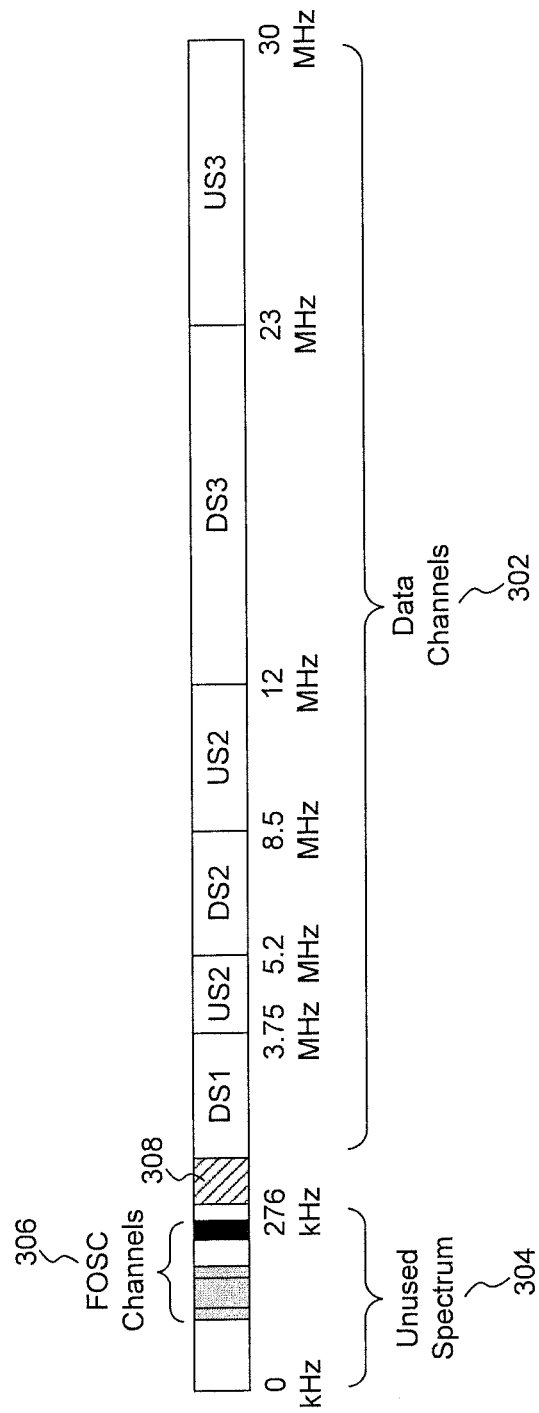
FIG. 3 is a block diagram illustrating data channels and Fiber to the x out-of-band Synchronization and Control (FOSC) channels in accordance with an embodiment of the present disclosure.

In an embodiment, the synchronization processor and frequency combiner includes suitable logic, circuitry, and/or code that is configured to receive the information (e.g., modem synchronization information and data) from a modem coupled to the ONU. The synchronization processor and frequency combiner is further configured to receive the output synchronization signal and the control signals from the ONU. The synchronization processor and frequency combiner is configured to output the signals to the CPE via the copper network segment. In particular, the synchronization processor and frequency combiner is configured to generate out-of-band (OOB) synchronization signals and control signals that occupy out-of-band (OOB) frequencies (or channels). The OOB channels can be, for example, low-frequency bands as shown in FIG. 3. For example, the OOB channels can be the low-frequency bands found in the unused spectrum from 0 to 276 kHz.

In an embodiment, each CPE includes a power splitter, a power supply, a synchronization processor and frequency combiner, a modem and a gateway as shown in FIG. 2. In an embodiment, the synchronization processor and frequency combiner of the CPE is similar to the synchronization processor and frequency combiner coupled to the ONU and includes suitable logic, circuitry, and/or code that is configured to receive the information (e.g., OOB synchronization signals, OOB control signals, and/or modem synchronization information and data) from the ONU, to output the modem synchronization information and data to the modem, and to output the synchronization and control signals to the gateway. That is, in an embodiment, the synchronization processor and frequency combiner of the CPE can perform the inverse of the processing performed by the synchronization processor and frequency combiner coupled to the ONU.

In an embodiment, the gateway includes suitable logic, circuitry, and/or code that is configured to convert signals received by the CPE from the ONU to one or more communication protocols (e.g., Ethernet, Wi-Fi, 3G, 4G, etc.) and to perform the inverse conversion on outgoing signals (i.e., signals being sent to the ONU. The gateway is configured to receive the synchronization signals and control signals from the synchronization processor and frequency combiner and data from the modem. In particular, the gateway is configured to process the received data utilizing the synchronization and control signals received from the synchronization processor and frequency combiner. That is, the gateway utilizes the synchronization and control signals received from the synchronization processor and frequency combiner rather than modem sync signals provided to the gateway in conventional optical networks. In other words, the modem is bypassed for sending the out-of-band synchronization signals.

2. Passive Optical Networks

Passive optical networks (PONs) will now be described with reference to FIG. 1. Example PON 100 is provided for the purpose of illustration only and is not limiting of embodiments. As shown in FIG. 1, example PON 100 includes an OLT 102 and a plurality of Optical Network Units (ONUs) 104a, 104b, and 104c. ONUs 104a, 104b, and 104c are coupled to OLT 102 via respective optical links 114a, 114b, and 114c, a splitter 112, and a shared optical link 110. ONUs 104a, 104b, and 104c can each serve one or more subscriber devices. For example, as shown, ONU 104a serves customer premises equipment (CPE) 116a, ONU 104b serves CPE 116b, and ONU 104c serves CPE 116c. As shown in FIG. 1, an ONU can serve multiple devices (e.g., CPE 116a and 116c) or a single device (e.g., CPE 116b).

In an embodiment, OLT 102 includes, without limitation, processor circuitry 102, a memory 108, and an optical transceiver 122. Memory 108 can store logic instructions for execution by processor circuitry 106 in order to perform the OLT functions described herein. Optical transceiver 122 includes an optical transmitter and receiver for transmitting and receiving optical signals over optical link 110. Similarly, in an embodiment, each of ONUs 104a, 104b, and 104c can include, without limitation, processor circuitry 120, a memory 118, and an optical transceiver 124. Memory 118 can store logic instructions for execution by processor circuitry 120 in order to perform the ONU functions described herein. Downstream transmission from OLT 102 is broadcast to all ONUs 104. Each ONU 104 filters its respective data according to pre-assigned addresses. In an embodiment, splitter 112 is a 1 to N splitter (i.e., a splitter capable of distributing traffic between single OLT 102 and N ONUs 104).

Ethernet passive optical networks (EPONs) combine the Ethernet packet framework with PON technology. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Furthermore, EPONs are more suitable for Internet Protocol (IP) traffic, since Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers.

Transmissions within an EPON are typically performed between an OLT (e.g., OLT 102) and ONUs (e.g., ONUs 104). The OLT 102 generally resides in a central office and couples the optical access network to the metro backbone, which is typically an external network belonging to an ISP or a local exchange carrier. Each ONU 104 can be located either at the curb or at an end-user location, and can provide broadband voice, data, and video services.

Communications within an EPON can be divided into upstream traffic (from ONUs 104 to OLT 102) and downstream traffic (from OLT 102 to ONUs 104). In the upstream direction, ONUs 104 share channel capacity and resources, because there is only one link coupling the passive optical coupler with the OLT 102. In the downstream direction, because of the broadcast nature of the 1×N passive optical coupler, downstream data frames are broadcast by the OLT 102 to ONUs 104 and are subsequently extracted by their destination ONUs 104 based on their individual Logic Link Identifiers (LLIDs) (e.g., as defined in the IEEE 802.3 standard). An LLID carries physical address information for a frame and determines which ONU is allowed to extract the frame. LLIDs can represent, for example, a customer or a service for a customer, or they can be used for some other purpose. An LLID establishes a logical link between an ONU (e.g., any of ONUs 104) and an OLT (e.g., OLT 102), which accommodates specific service level agreement (SLA) requirements.

3. Communication Between an Olt and Cpe

Figure 2A:
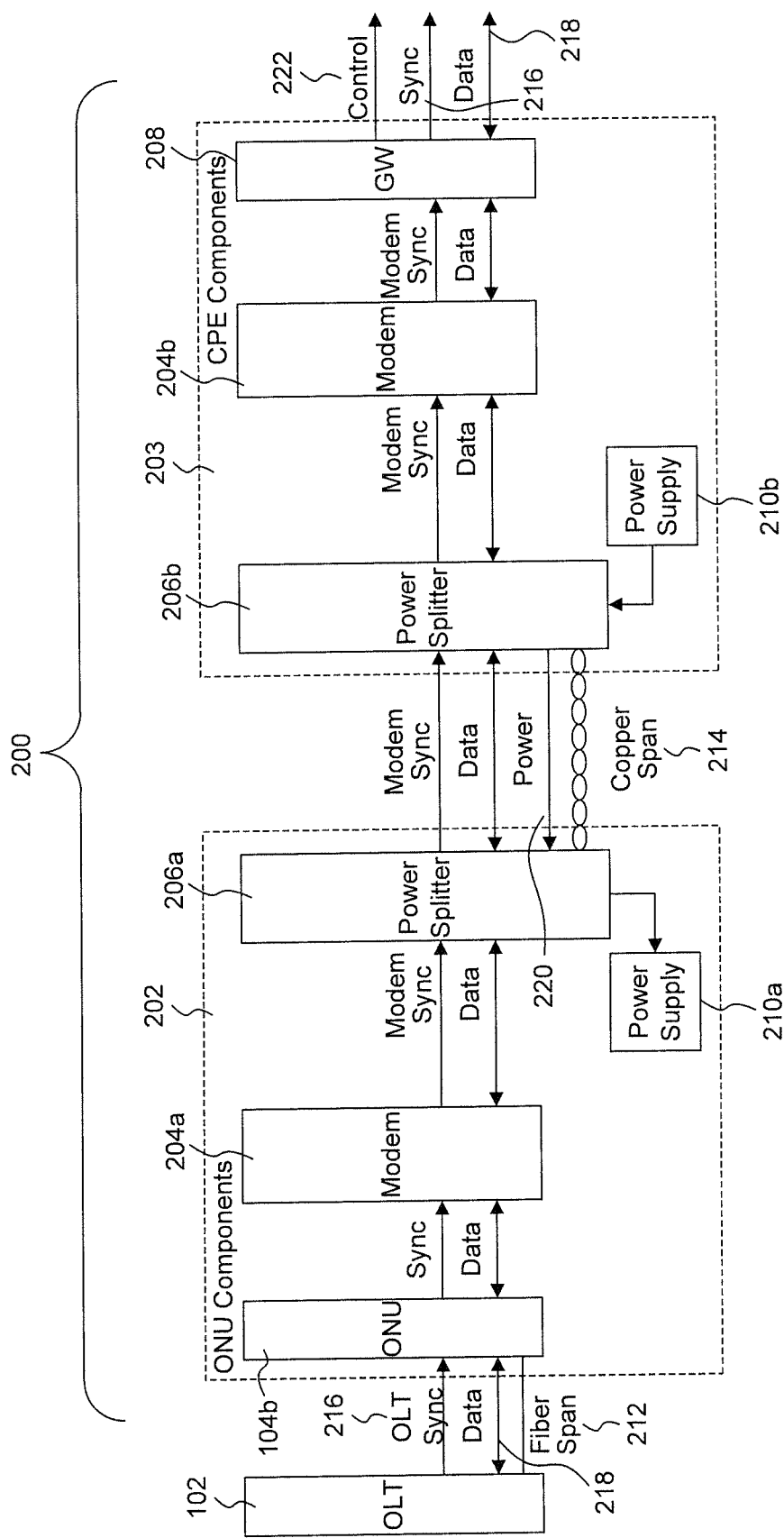
FIG. 2A is a diagram illustrating communication between an optical line terminal (OLT), optical network unit (ONU) components, and customer premises equipment (CPE) components in accordance with an embodiment of the present disclosure.

FIG. 2A is a diagram illustrating communication between OLT 102, ONU components 202, and CPE components 203 in accordance with an embodiment of the present disclosure. In an embodiment, a subscriber device 200 includes ONU components 202 and CPE components 203. ONU components 202 include ONU 104b, modem 204a, power splitter 206a, and power supply 210a. In an embodiment, ONU components 202 are implemented within ONU 104b. In another embodiment, ONU components 202 are coupled to ONU 104b but are implemented using separate devices. CPE components 203 include power splitter 206b, modem 204b, gateway 208, and power supply 210b. In an embodiment, CPE components 203 are implemented on a single device (e.g., CPE 116b). Alternatively, CPE components 203 can be implemented using multiple devices.

In an embodiment, OLT 201 is coupled to ONU components 202 over a fiber span 212, and ONU components 202 are coupled to CPE components 203 over a copper span 214. While copper span 214 is discussed herein as a physical connection made using copper, it should be understood that embodiments of the present disclosure are not limited to copper and that other materials may be used to implement a physical connection between ONU components 202 and CPE components 203. OLT 102 transmits data 218 to ONU 104b over fiber span 212 using optical signals. OLT 102 also transmits synchronization information 216 to ONU 104b to ensure that OLT 102, ONU components 202, and CPE components 203 are properly synchronized with each other to ensure proper communication of data 218. In an embodiment, synchronization information 216 can also include control information for causing gateway 208 to send one or more control signals 222 to CPE coupled to gateway 208 (e.g., CPE 116b). ONU 104b receives synchronization information 216 and data 218 and converts the optical signals to electrical signals. ONU 104b transmits synchronization information 216 and data 218 to modem 204a, which modulates or demodulates synchronization information 216 and data 218 and transmits it to power splitter 206a.

In an embodiment, power splitter 206a transmits synchronization information 216 and data 218 to power splitter 206b over copper span 214. In an embodiment, power splitters 206 are coupled to respective power supplies 210 for powering ONU components 202 and CPE components 203, respectively. In an embodiment, power splitter 206b can be used to provide power 220 to power splitter 206a over copper span 214. Thus, in an embodiment, one or more of power supplies 210 may not be necessary.

Power splitter 206b receives synchronization information 216 and data 218 from power splitter 206a and transmits synchronization information 216 and data 218 to modem 204b. Modem 204b modulates or demodulates synchronization information 216 and data 218 and transmits it to gateway 208. Gateway 208 processes synchronization information 216 and data 218 and converts synchronization information 216 and data 218 to one or more communication protocols (e.g., Ethernet, Wi-Fi, 3G, 4G, etc.). In an embodiment, gateway 208 generates one or more control signals 222 to CPE that is coupled to gateway 208 (e.g., CPE 116b) based on the received information. Gateway 208 also sends synchronization information 216 and data 218 to the coupled CPE.

Gateway 208 can also be used to send data 218 from the coupled CPE upstream to OLT 102. For example, gateway 208 can convert data 218 to be sent upstream from one or more communication protocols (e.g., Ethernet, Wi-Fi, 3G, 4G, etc.) to an electrical signal suitable for sending to modem 204b. Gateway 208 can then transmit upstream data 218 to modem 204b. The data 218 is transmitted across power splitter 206b, copper span 214, power splitter 206a, modem 204a, and ONU 104b. ONU 104b converts data 218 from an electrical format to an optical format and transmits it to OLT 102.

4. Out of Band Synchronization and Control Channels

As technology progresses, data rates increase for signals transmitted downstream from OLT 102 to CPE components 203 and upstream from CPE components 203 to OLT 102. As this data rate increases, greater noise is introduced into the transmitted signals, and the difficulty of properly synchronizing OLT 201, ONU components 202, and CPE components 203 increases. Further, it becomes more difficult to correct synchronization and control errors that are introduced in the signals during transmission.

For example, in conventional PON-based systems, using modem 204a to transmit synchronization information 216 and control information across copper span 214 requires that each CPE be capable of synthesizing a high quality output synchronization signal, thus resulting in higher system cost and complexity. Further, the increasing data rate increases the difficulty of maintaining continuous, end-to-end synchronization reference and control connectivity during periods when the data channels on copper span 214 are in an energy efficiency mode, such as a low-power and/or sleep mode—i.e., when the symbol rate over copper span 214 is low or zero.

Embodiments of the present disclosure address these concerns by using of out-of-band (OOB) channels for the transport of synchronization information 216 and control information. Because these OOB channels are located outside of the frequency bands used for data channels, noise is reduced and synchronization and error correction are easier. In an embodiment, ONU 104b includes a synchronization and control module that causes synchronization information 216 and control information to be sent over copper span 214 using OOB channels.

Figure 2B:
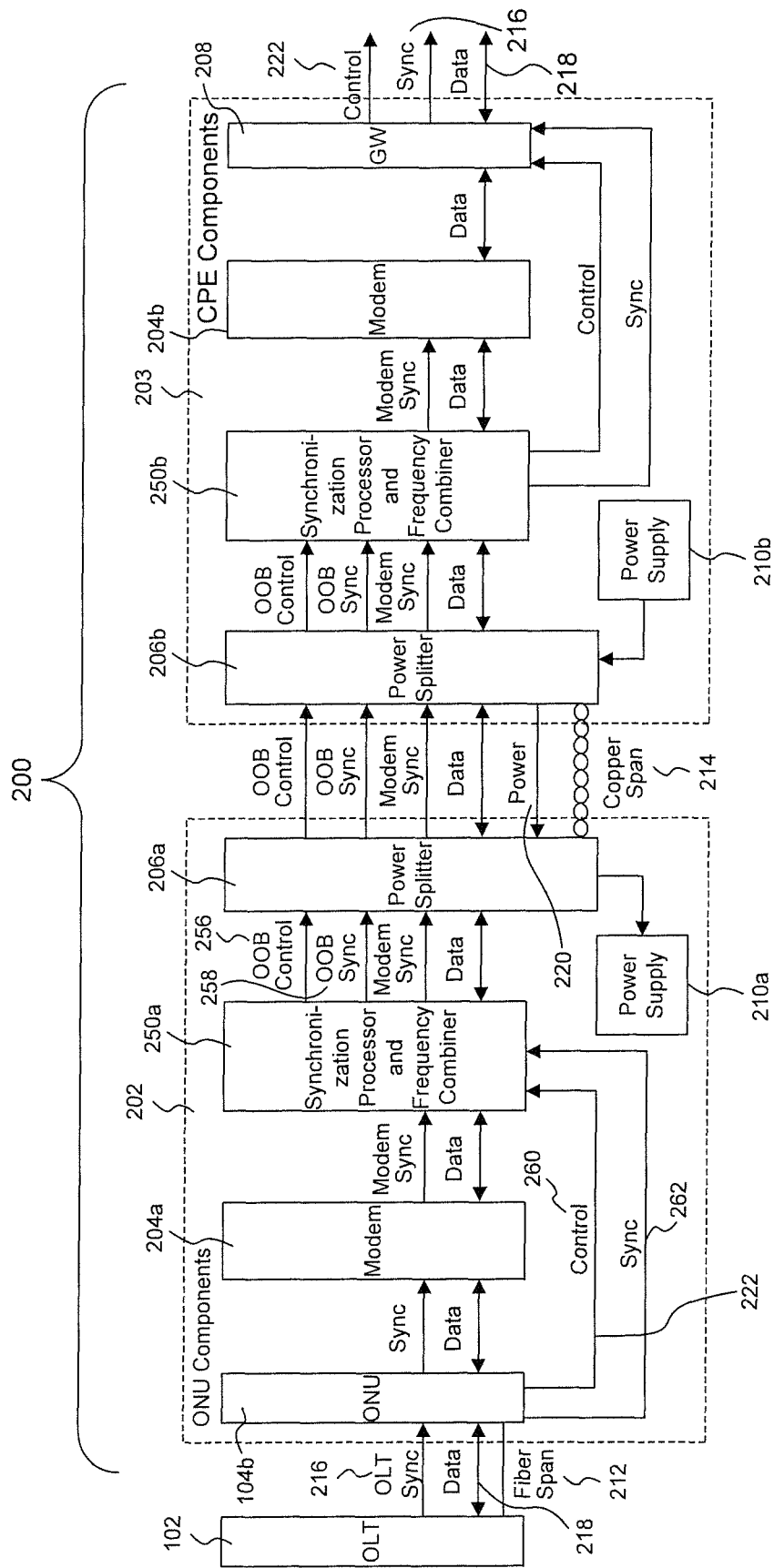
FIG. 2B is a diagram illustrating communication between an optical line terminal (OLT), optical network unit (ONU) components, and customer premises equipment (CPE) components using OOB synchronization and control channels in accordance with an embodiment of the present disclosure.

FIG. 2B is a diagram illustrating communication between an optical line terminal (OLT), optical network unit (ONU) components, and customer premises equipment (CPE) components using OOB synchronization and control channels in accordance with an embodiment of the present disclosure. In FIG. 2B, ONU components 202 and CPE components 203 include synchronization processors and frequency combiners 250. ONU 104b receives synchronization information 216 from OLT 102. In an embodiment, ONU 104b also receives control information from OLT 102. In an embodiment, synchronization information 216 includes control information. Alternatively in an embodiment, ONU 104b generates control information based on synchronization information 216 and/or data 218 received from OLT 102. In an embodiment, synchronization information 216 includes frequency information, phase information, time of day, and the like that are used in synchronizing with the OLT to the CPE, and that are extracted by the ONU during signal processing. In an embodiment, control information includes operations, administration, and maintenance (OAM) information, link control messaging, etc.

As discussed earlier, the in-band channels used for data communication can experience periods of performance degradation (e.g., due to the presence of high-frequency interference), especially at higher data rates. Thus, instead of sending synchronization information 216 and control information over channels that are also used to transmit data, ONU 104b synthesizes desired output synchronization 262 and control 260 signals and sends them to synchronization processor and frequency combiner 250a, causing synchronization processor and frequency combiner 250a to transmit synchronization signal 262 and control signal 260 using OOB synchronization signal 258 and OOB control signal 256 that are sent over OOB channels to reduce noise and enable easier synchronization and error correction. In an embodiment, a synchronization and control module (discussed later with reference to FIG. 4) implemented within ONU 104b synthesizes the desired synchronization output from the OLT information and sends signals 262, 260 to synchronization processor and frequency combiner 250a. Upon receiving the signals 262, 260 (e.g. digital signal or instructions) from ONU 104b, synchronization processor and frequency combiner 250a generates OOB control signal 256 and OOB synchronization signal 258 having the synchronization and control information and transmits to power splitter 206a over the OOB channels.

For example, in an embodiment, the synchronization signal 262 and control signal 260 transmitted by ONU 104b bypasses modem 204a. Instead of transmitting this information through modem 204a using in-band data channels, ONU 104b transmits synchronization signal 262 and control signal 260 directly to synchronization processor and frequency combiner 250a, bypassing modem 204a. In an embodiment, synchronization processor and frequency combiner 250a includes a synchronization processor that generates OOB control signal 256 and OOB synchronization signal 258 based on synchronization signal 262 and control signal 260. In an embodiment, synchronization processor and frequency combiner 250a also includes analog components (e.g., one or more mixers, filters, etc.) that combine OOB synchronization signal 258, OOB control signal 256, and data 218. Synchronization processor and frequency combiner 250a passes OOB synchronization signal 258 and OOB control signal 256 over low frequency channels and data 218 over higher frequency data channel to the power splitter 206a.

Power splitter 206a transmits OOB control signal 256 and OOB synchronization signal 258 to power splitter 206b over copper span 214 using the OOB channels and data 218 over data channels. Power splitter 206b receives data 218, OOB control signal 256, and OOB synchronization signal 258. Power splitter 206b sends data 218, OOB control signal 256, and OOB synchronization signal 258 to synchronization processor and frequency combiner 250b. Synchronization processor and frequency combiner 250b receives data 218, OOB control signal 256, and OOB synchronization signal 258 as a single combined signal and derives data signal 218, synchronization signal 262, and control signal 260 from the single combined signal. Synchronization processor and frequency combiner 250b transmits synchronization signal 262 and control signal 260 directly to gateway 208, bypassing modem 204b. In an embodiment, gateway 208 includes components to convert synchronization signal 262 and control signal 260 to the signal(s) that contain the synchronization information sent by OLT 102 (e.g., to synchronization information 216). Gateway 208 can then transmit control signal 222, synchronization information 216, and/or data 218 to CPE coupled to gateway 208 (e.g., CPE 116b).

In an embodiment, ONU 103b can send synchronization information 216 and control information 222 to CPE components 203 over both the OOB channels and in-band channels (e.g., to provide additional verification). For example, in an embodiment, ONU 104b can send synchronization information 216 and control information 222 via modem 204a over in-band channels and can additional send control signal 260 and synchronization signal 262 directly to synchronization processor and frequency combiner 250a for transmission over the OOB channels. This redundancy can be used for additional verification. Alternatively, in an embodiment, synchronization processor and frequency combiner 250a and/or power splitter 206a send only data 218 over in-band channels via modem 204a and send synchronization signal 262 and control signal 260 directly to synchronization processor and frequency combiner 250a over the OOB channels only.

FIG. 3 is a block diagram illustrating exemplary data channels and Fiber to the x out-of-band Synchronization and Control (FOSC) channels in accordance with an embodiment of the present disclosure. As shown in FIG. 3, the data channels occupy frequency spectrum 302 and there is an unused frequency spectrum 304 at frequencies below the frequency spectrum 302. In an embodiment, unused spectrum 304 is in the 0 kHz to 276 kHz range. In an embodiment, there is a guard band 308 separating unused spectrum 304 from the spectrum 302 used to transmit data channels. In an embodiment, systems and methods according to embodiments of the present disclosure are configured to transmit OOB control signal 256 and OOB synchronization signal 258 over one or more FOSC channels 306 in this unused spectrum 304 below guard band 308. It should be understood that the frequency spectrums shown in FIG. 3 are provided by way of example and are not liming. For example, systems and methods according to embodiments of the present disclosure can be configured to communicate OOB control signal 256 and OOB synchronization signal 258 over spectrums other than unused spectrum 304.

5. Example Onu Embodiment

Figure 4:
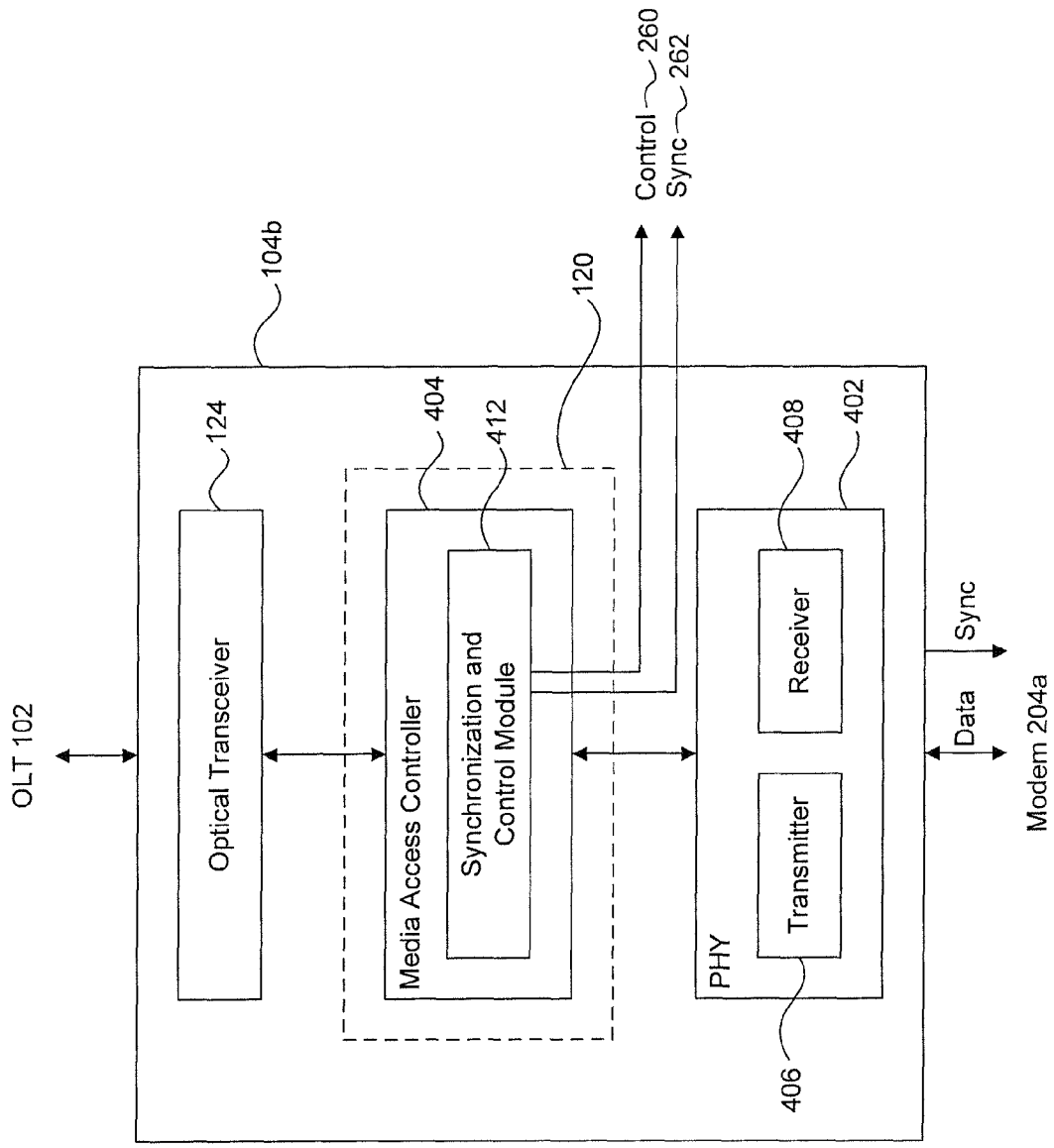
FIG. 4 is a diagram showing how a synchronization and control module can be implemented in an ONU in accordance with an embodiment of the present disclosure.

FIG. 4 is a diagram showing how a synchronization and control module can be implemented in an ONU in accordance with an embodiment of the present disclosure. Example ONU 104b shown in FIG. 4 is provided for the purpose of illustration only and is not limiting of embodiments. As shown in FIG. 4, ONU 104b communicates with OLT 102 and modem 204a. In an embodiment, ONU 104b includes optical transceiver 124 for communicating with OLT 102 and a physical layer (PHY) device 402 for communicating with modem 204a. In an embodiment, PHY 402 is a copper PHY, in contrast to the optical PHY of transceiver 124. PHY 402 includes a transmitter 406 and a receiver 402.

ONU 104b also includes processor circuitry 120. Processor circuitry 120 includes a Media Access Controller (MAC) 404. In an embodiment, MAC 404 can implement a subscriber side EPON MAC layer as defined in the IEEE 802.3 standard specifications. In an embodiment, MAC 404 includes a synchronization and control module 412. After ONU 104b receives synchronization information 216 and/or control information from OLT 102, synchronization and control module 412 is configured to synthesize desired output control signal 260 and synchronization signal 262 based on synchronization information 216 and control information received from OLT 102. Synchronization and control module 412 sends control signal 260 and synchronization signal 262 directly to synchronization processor and frequency combiner 250a so that synchronization processor and frequency combiner 250a will transmit OOB control signal 256 and OOB synchronization signal 258 using OOB channels to reduce noise and enable easier synchronization and error correction.

6. Exemplary Synchronization Processor and Frequency Combiner Embodiment

Figure 5A:
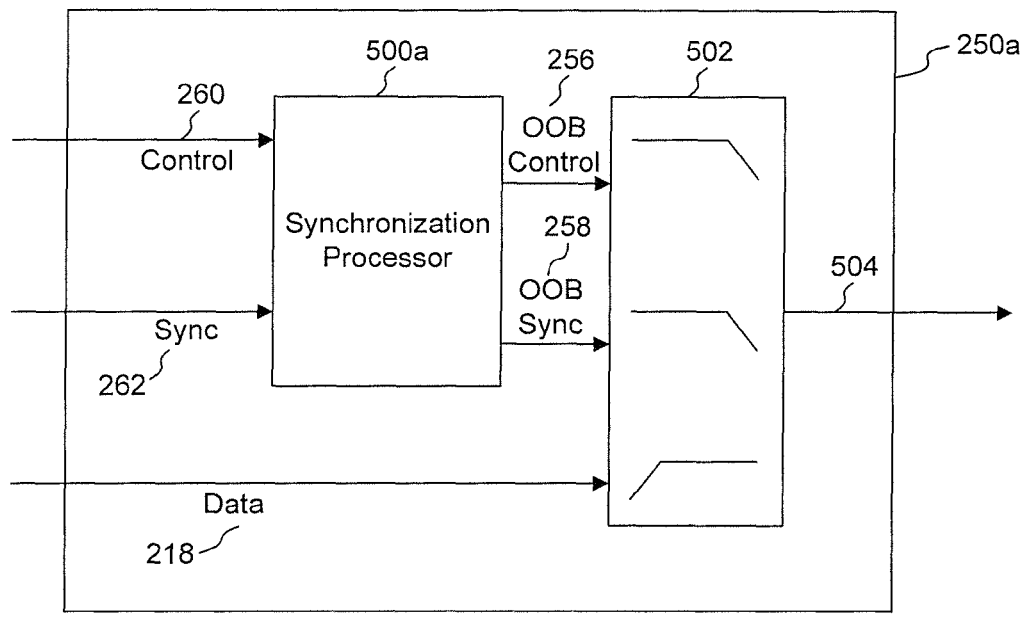
FIGS. 5A and 5B are diagrams of exemplary synchronization processors and frequency combiners in accordance with an embodiment of the present disclosure.
Figure 5B:
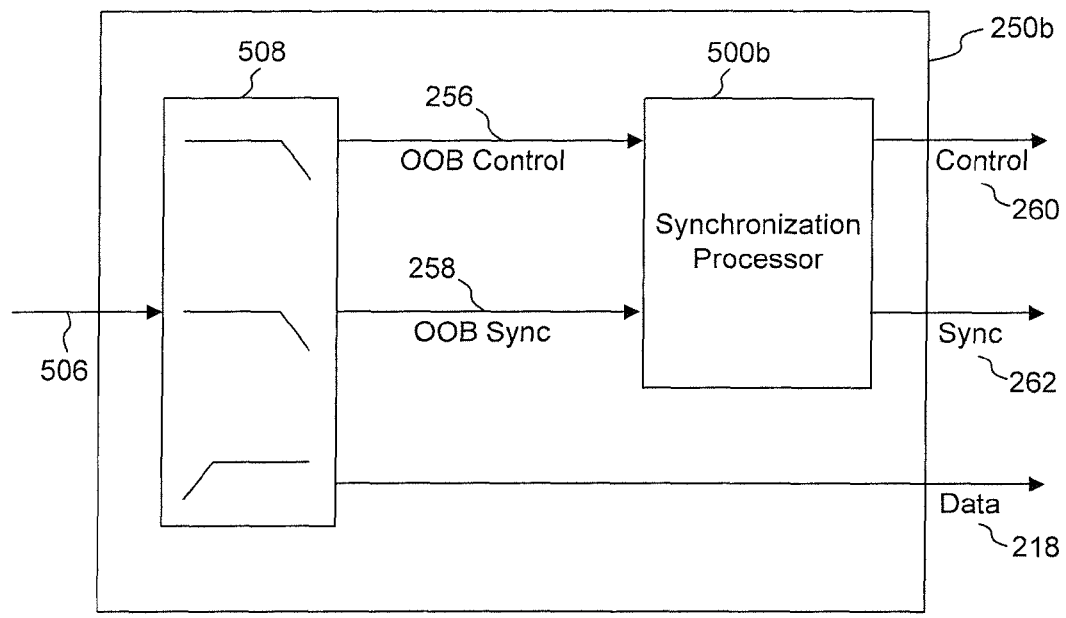

FIGS. 5A and 5B are diagrams of exemplary synchronization processors and frequency combiners in accordance with an embodiment of the present disclosure. FIG. 5A is a diagram of synchronization processor and frequency combiner 250a. Synchronization processor and frequency combiner 250a includes synchronization processor 500a and analog diplexer 502. Synchronization processor 500a receives control signal 260 and synchronization signal 262 and generates OOB control signal 256 and OOB synchronization signal 258 so that control signal 260 and synchronization signal 262 can be transmitted over OOB channels. For example, synchronization processor 500a can generate a digital carrier signal (e.g. a sinewave, or modulated sinewave) having a frequency located in the OOB channels, where the frequency and phase are representative of the synchronization information from the OLT. In an embodiment, the digital carrier signal can be converted to analog by a digital to analog converter (not shown) and passed to analog diplexer 502. Analog diplexer 502 receives OOB control signal 256, OOB synchronization signal 258, and data signal 218. Analog diplexer 502 multiplexes data signal 218, OOB control signal 256, and OOB synchronization signal 258 and transmits these signals as a single output signal 504 for transmission to power splitter 206a. In an embodiment, analog diplexer 502 includes one or more filters. For example, analog diplexer 502 can include one or more low pass filters to pass OOB control signal 256 and OOB synchronization signal 258 at low OOB frequencies and one or more high pass filters to pass data 218 at higher frequencies.

FIG. 5B is a diagram of synchronization processor and frequency combiner 250b. Synchronization processor and frequency combiner 250b includes synchronization processor 500b and analog diplexer 508. Analog diplexer 508 receives a single input signal 506 and derives OOB control signal 256, OOB synchronization signal 258, and data signal 218 from input signal 506. For example, analog diplexer 508 can demultiplex data signal 218, OOB control signal 256, and OOB synchronization signal 258. In an embodiment, analog diplexer 508 includes one or more filters. For example, analog diplexer 508 can include one or more low pass filters to pass OOB control signal 256 and OOB synchronization signal 258 at low OOB frequencies and one or more high pass filters to pass data 218 at higher frequencies. An analog to digital converter (ADC) can be coupled to the output of diplexer 508 to convert the signals to digital for processor 500b. Synchronization processor 500b receives OOB control signal 256 and OOB synchronization signal 258 and generates control signal 260 and synchronization signal 262. Synchronization processor and frequency combiner 250b sends control signal 260 and synchronization signal 262 directly to gateway 208 and sends data 218 to modem 204b.

7. Phase Offset and Time Delay Compensation

In an embodiment, ONU components 202 and CPE components 203 cooperatively determine a phase of OOB control signal 256 and OOB synchronization signal 258. In an embodiment, phase synchronization can be implemented using a two way time transfer. In an embodiment, a "ping-pong" scheme can be used to provide a symmetric path in terms of propagation delay to support this two way time transfer. This "ping-pong" scheme can use the same frequency band in both directions to ensure a symmetric path, regardless of the delay characteristics of a splitter filter or any other element in the path.

In an exemplary "ping pong" time transfer scheme, one network component can be designated as a master, and another network component can be designated as a slave. The master and slave can communicate to determine a phase offset and a round trip time (i.e., time delay) between network components. For example, in an embodiment, synchronization processor 500a can be designated as a master, and synchronization processor 500b can be designated as a slave.

For example, in an embodiment, synchronization processor 500a can send a first signal, such as a sine wave, to synchronization processor 500b for a duration of time T. Synchronization processor 500b acquires the phase of the incoming first signal. Synchronization processor 500a then stops sending the first signal to synchronization processor 500b, and the direction of the channel is reversed. Synchronization processor 500b transmits a second signal to synchronization processor 500a with the same phase synchronization processor 500b received the first signal for a duration of time T. Synchronization processor 500a acquires the phase of the incoming second signal and compares it to the phase of the first signal synchronization processor 500a transmitted to synchronization processor 500b. The phase difference between these two signals can be used to estimate the round trip time. In an embodiment, the frequency of the signals should be low enough to not cause ambiguity in the round trip time measurement. Synchronization processor 500a can then send synchronization processor 500b information about the round trip time that synchronization processor 500b can use to adjust its time of day estimate.

8. Exemplary Implementations

In an embodiment, fiber span 212 is IEEE 1 G-EPON or 10 G-EPON, and copper span 214 is VDSL2, ITU-T G.fast, IEEE 100 BaseT, or 1000 BaseT. In another embodiment, fiber span 212 is ITU-T G-PON or xG-PON, or NG-PON2, and copper span 214 is VDSL2, ITU-T G.fast, IEEE 100 BaseT, or 1000 BaseT.

In an embodiment, the CPE coupled to gateway 208 derives the customer-facing network-synchronization signal solely from information carried by the FOSC channels. In another embodiment, the CPE coupled to gateway 208 derives the customer-facing network-synchronization signal from a combination of information carried by the FOSC channels and information carried by the data channels.

In an embodiment, the CPE coupled to gateway 208 derives an 8 kHz BITS clock from synchronization information 216 delivered across copper span 214 and presents this signal to the customer network. In another embodiment, the CPE coupled to gateway 208 derives GPS-like synchronization signals from synchronization information 216 delivered across copper span 214 and presents this signal to the customer network.

In another embodiment, fiber span 212 is any of the IEEE or ITU-T solutions described above, and copper span 214 is replaced by another in-home distribution technology. Examples of such an in-home technology include, but are not limited to, power-line communications, Wi-Fi, Multimedia over Coax Alliance (MOCA) networks, etc. All of the advantages and functions described in this disclosure are equally applicable to this variation provided out-of-band channels can be defined for the transport of synchronization and management information.

9. Methods

Figure 6:
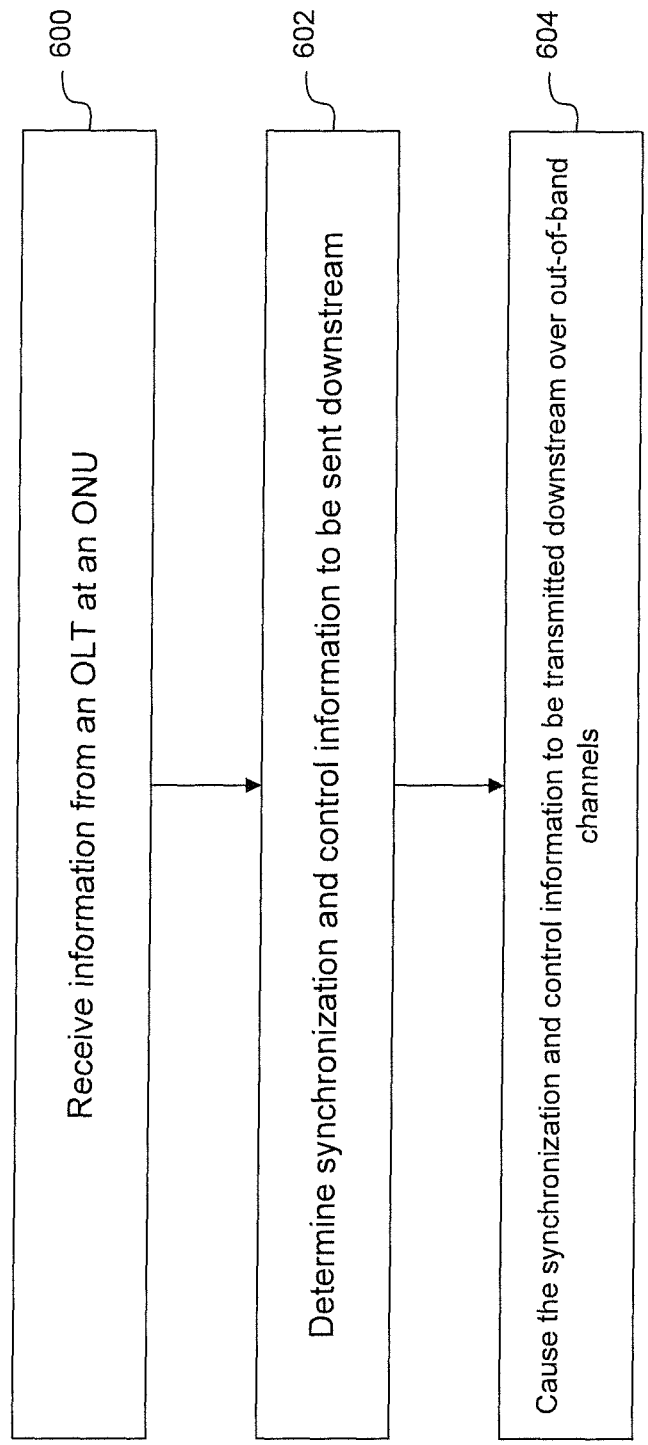
FIG. 6 is a flowchart of a method for providing synchronization and control information using out-of-band (OOB) channels in accordance with an embodiment of the present disclosure.

FIG. 6 is a flowchart of a method for providing synchronization and control information 222 using out-of-band (OOB) channels in accordance with an embodiment of the present disclosure. In step 600, information is received from an OLT at an ONU. For example, ONU 104b receives information from OLT 102. This information can include synchronization information 216 and data 218. In an embodiment, this information can also include control information. In step 602, synchronization information and control information to be sent downstream are determined. For example, synchronization and control module 412 of ONU 104b synthesizes desired output control signal 260 and synchronization signal 262 based on the signals received from OLT 102.

In step 604, synchronization and control module 412 causes the synchronization and control information to be transmitted downstream over out-of-band channels. For example, in an embodiment, synchronization and control module 412 of ONU 104b sends control signal 260 and synchronization signal 262 directly to synchronization processor and frequency combiner 250a so that synchronization processor and frequency combiner 250a will transmit OOB control signal 256, and OOB synchronization signal 258 using OOB channels to reduce noise and enable easier synchronization and error correction. In an embodiment, analog components in synchronization processor and frequency combiner 250a combine OOB control signal 256, OOB synchronization signal 258, and data 218 and generate a single output signal for downstream transmission.

10. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented in hardware, software, or some combination thereof. For instance, signal processing functions can be implemented using computer processors, computer logic, application specific circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A subscriber device, comprising:
an optical network unit (ONU), wherein the ONU is configured to:
receive a communication from an optical line terminal (OLT), the communication including synchronization information, control information, and data, and
generate a synchronization signal including the synchronization information; and
a synchronization processor and frequency combiner coupled to the ONU, wherein the synchronization processor and frequency combiner is configured to:
receive the synchronization signal,
generate, using the synchronization signal, an out-of-band (OOB) synchronization signal that oscillates at a frequency and phase determined based on the synchronization information and the control information, and
transmit the OOB synchronization signal to customer premises equipment (CPE) over one or more OOB channels of a physical connection used to carry electrical signals between the ONU and the CPE, wherein the one or more OOB channels are OOB with respect to channels used to carry the data.

2. The subscriber device of claim 1, wherein the one or more OOB channels are located below a guard band in a frequency spectrum.

3. The subscriber device of claim 2, wherein the guard band separates a spectrum used for transmitting the one or more OOB channels from a data spectrum used for transmitting data channels to the CPE.

4. The subscriber device of claim 3, wherein the ONU is further configured to cause the synchronization processor and frequency combiner to transmit the data in the data spectrum.

5. The subscriber device of claim 1, wherein the one or more OOB channels are located below 276 kHz.

6. The subscriber device of claim 1, further comprising:
a modem coupled between the ONU and the synchronization processor and frequency combiner.

7. The subscriber device of claim 1, wherein the synchronization processor and frequency combiner is configured to transmit the OOB synchronization signal to the CPE over the one or more OOB channels via a power splitter coupled to the synchronization processor and frequency combiner.

8. The subscriber device of claim 7, wherein a second power splitter is coupled to the CPE, and wherein the power splitter is configured to transmit the OOB synchronization signal to the second power splitter over the one or more OOB channels via the physical connection.

9. The subscriber device of claim 1, wherein the ONU further comprises:
a synchronization and control module configured to generate the synchronization signal.

10. The subscriber device of claim 1, wherein the OOB synchronization signal is a sine wave.

11. The subscriber device of claim 1, wherein the synchronization processor and frequency combiner is further configured to determine a time delay between the synchronization processor and frequency combiner and a second synchronization processor and frequency combiner coupled to the CPE.

12. An apparatus, comprising:
a memory; and
processor circuitry, wherein the processor circuitry is configured to:
receive a communication from an optical line terminal (OLT), the communication comprising synchronization information, control information, and data,
generate a data signal based on the data for transmission over one or more data channels of a physical connection used to carry electrical signals between an optical network unit (ONU) and a customer premises equipment (CPE), wherein the data channels are located in a first frequency spectrum, and
generate an out-of-band (OOB) synchronization signal that oscillates at a frequency and phase determined based on the synchronization information and the control information for transmission over one or more OOB channels of the physical connection, wherein the one or more OOB channels are located OOB, with respect to the data channels, in a second frequency spectrum.

13. The apparatus of claim 12, wherein the second frequency spectrum is below the first frequency spectrum.

14. The apparatus of claim 12, wherein a guard band separates the first frequency spectrum from the second frequency spectrum.

15. The apparatus of claim 12, wherein the synchronization information comprises frequency information, phase information, and time of day information.

16. The apparatus of claim 12, wherein the control information includes operations, administration, and maintenance (OAM) information and link control messaging.

17. A method, comprising:
- receiving a communication from an optical line terminal (OLT), the communication comprising synchronization information, control information, and data; and
- generating an out-of-band (OOB) synchronization signal that oscillates at a frequency and phase determined based on the synchronization information and the control information; and
- transmitting the OOB synchronization signal to customer premises equipment (CPE) over one or more OOB channels of a physical connection used to carry electrical signals between the OLT and the CPE, wherein the one or more OOB channels are located OOB, with respect to data channels used to carry the data, in a first frequency spectrum.

18. The method of claim 17, further comprising:
- transmitting the data over the data channels, wherein the data channels are located in a second frequency spectrum.

19. The method of claim 18, wherein the one or more OOB channels are located below a guard band separating the first frequency spectrum from the second frequency spectrum.

20. The method of claim 17, wherein the first frequency spectrum comprises frequencies below 276 kHz.

* * * * *